United States Patent
Sikora et al.

(10) Patent No.: US 7,649,404 B2
(45) Date of Patent: Jan. 19, 2010

(54) INDEPENDENT THRESHOLDS FOR POWER SUPPLY CONTROL CIRCUITRY

(75) Inventors: John Sikora, McKinney, TX (US); Gary Williams, Rowlett, TX (US); Paul Anthony Wirtzberger, Greenville, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 11/580,756

(22) Filed: Oct. 13, 2006

(65) Prior Publication Data

US 2008/0088294 A1 Apr. 17, 2008

(51) Int. Cl.
G05F 1/56 (2006.01)

(52) U.S. Cl. ...................................... 327/541
(58) Field of Classification Search ................. 323/318, 323/234, 304, 322, 349, 350; 327/541
See application file for complete search history.

(56) References Cited

U.S. PATENT DOCUMENTS

| | | | |
|---|---|---|---|
| 4,618,779 A | 10/1986 | Wiscombe | |
| 5,122,726 A | 6/1992 | Elliott et al. | |
| 5,177,372 A | 1/1993 | Yajima et al. | |
| 5,883,797 A | 3/1999 | Amaro et al. | |
| 6,014,322 A | 1/2000 | Higashi et al. | |
| 6,236,582 B1 | 5/2001 | Jalaleddine | |
| 6,292,377 B1 | 9/2001 | Sasaki | |
| 6,301,133 B1 | 10/2001 | Cuadra et al. | |
| 6,507,129 B2 | 1/2003 | Buchanan | |
| 6,628,106 B1 | 9/2003 | Batarseh et al. | |
| 6,836,100 B2 | 12/2004 | Egan et al. | |
| 6,919,758 B1 * | 7/2005 | Preslar et al. | 327/541 |
| 7,002,265 B2 | 2/2006 | Potega | |
| 2003/0095366 A1 | 5/2003 | Pellegrino | |
| 2004/0095021 A1 | 5/2004 | Fogleman et al. | |
| 2005/0029476 A1 | 2/2005 | Biester et al. | |
| 2006/0044709 A1 | 3/2006 | Seiersen | |
| 2007/0029979 A1 * | 2/2007 | Williams et al. | 323/217 |

OTHER PUBLICATIONS

Michael F. Stratton, Sr., "Redifining Power Architecture for CompactPCI* Platforms", Publication from Intel, Bearing Copyright Date 2003, pp. 1-7.
"Maxim Low-Cost, High-Reliability, 0.5V to 3.3V ORing MOSFET Controllers", Data Sheet from Maxim Integrated Products, Bearing Copyright Date 2004, pp. 1-17.
"Universal Active ORing Controller", Data Sheet No. PD60229 revB, Published by International Rectifier, Bearing Date Dec. 15, 2005, pp. 1-12.

* cited by examiner

*Primary Examiner*—Jeffrey L Sterrett
*Assistant Examiner*—Fred E Finch, III

(57) ABSTRACT

A system may comprise a control system that controls a state of a switch network, the control system having first and second thresholds that determine the state of the switch network based on the relative voltages at an input and an output of the switch network. A scaling network is coupled across the input and the output of the switch network and providing a gain scaling signal to a first input of the control system. An offset network is coupled to the output of the switch network and providing an offset signal to a second input of the control system, the first threshold being set independently of the second threshold based on the gain scaling signal and the offset signal.

26 Claims, 2 Drawing Sheets

INDEPENDENT THRESHOLDS FOR POWER SUPPLY CONTROL CIRCUITRY

BACKGROUND

Many applications require highly reliable power supplies. Consequently, some power supply systems employ two or more power sources connected in parallel between ORing circuitry. This power supply configuration is known generally as parallel-connected power supplies or an N+1 power supply configuration. The ORing circuitry performs active ORing that combines two or more power sources to create a redundant power source, preserving the input power supply when one of the sources fails. Some traditional N+1 power supply configurations rely upon diode ORing the inputs to provide redundancy. Another type of ORing circuit can utilize one or more external MOSFETs (also known as OR-FETs) that effectively replaces traditional diode ORing. The use of OR-FETs can increase efficiency, but also requires the use of a control circuit to control operation of the MOSFETs.

DETAILED DESCRIPTION

Figure 1:
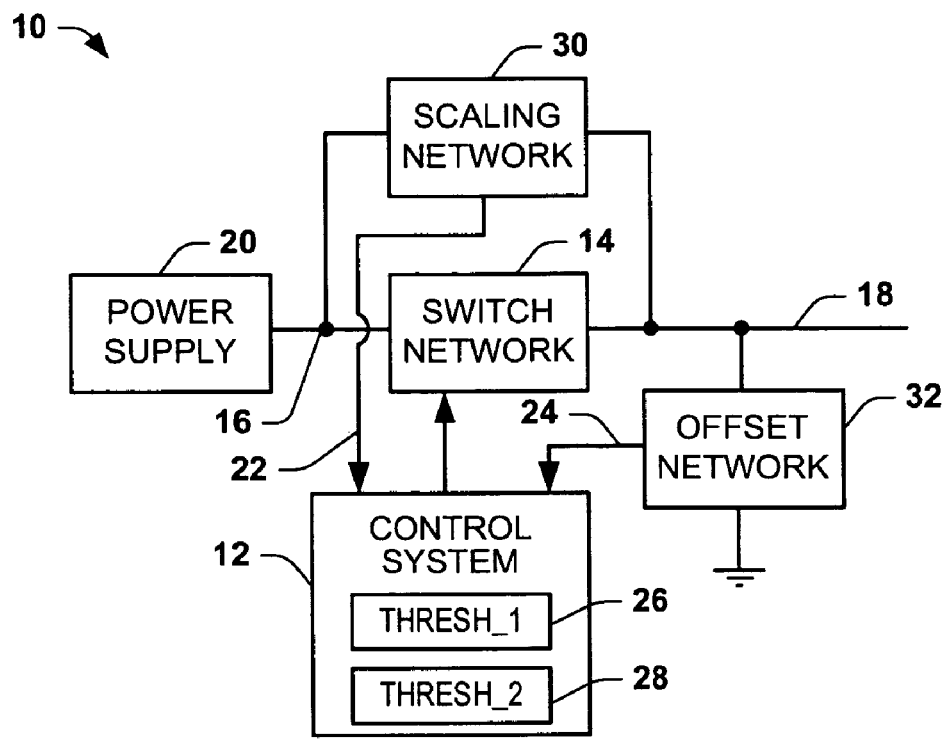
FIG. 1 depicts one embodiment of a system that can be provided according to an aspect of the present invention.

FIG. 1 depicts an example embodiment of a system 10. The system 10 includes a control system 12 that is configured to control a state of a switch network 14. The control system 12 controls the switch network 14 based on a voltage across an input 16 and an output 18 of the switch network. The input of the switch network 14 can be connected to a power supply voltage, such as provided by a corresponding power supply 20. For example, the power supply 20 can be implemented as a voltage regulator configured to supply a regulated output voltage at 16 or at 18, such as if remote sensing is used. The output 18 of the switch network 14 can correspond to an output bus to which one or more loads can be connected. By way of example, a plurality of power supply systems can be connected in parallel to the output 18. Such an arrangement affords redundancy for systems that require high-reliability power supplies.

The control system 12 can be configured to determine forward and reverse current states based on signals 22 and 24 received at respective first and second inputs of the control system. The control system 12 further can include first and second internal threshold components 26 and 28, respectively. The internal threshold components 26 and 28 can define substantially fixed thresholds for a given application, such as may be determined by a designer. For example, each of the internal threshold components 26 and 28 can be implemented as internal DC voltages that offset the respective signals 22 and 24 accordingly. For instance, depending on an operating mode (e.g., corresponding to a forward current mode and a reverse current mode of current flow through the switch network 14) the control system 12 can control the state of the switch network 14 based on application of the internal threshold components 26 and 28 to the voltage potential between the signals 22 and 24.

As one example, one internal threshold component (e.g., THRESH_1) 26 can correspond to a reverse current threshold that determines the amount of reverse current can be tolerated across the switch network 14 in a short circuit condition before the fault can be isolated by the control system 12 for turning off the switch network 14. Such current threshold should be set low enough so that load sharing and applications do not shut off the switch network at no load conditions. The other internal threshold component (e.g., THRESH_2) 28 can correspond to a forward current threshold that determines the amount of forward current can be tolerated across the switch network 14. The control system 12 thus can utilize the forward current threshold to determine if forward current condition exists during an overvoltage event based on the voltage across the switch network 14, namely the voltage potential across 16 and 18.

The system 10 also includes a scaling network 30 connected between the input 16 and the output 18 of the switch network 14. The scaling network 30 provides gain scaling to the control system 12 via the signal 22. The scaling network 30 cooperates with the internal threshold components 26 and 28 to adjust the forward and reverse current thresholds employed for controlling the state of the switch network. For example, the scaling network 30 can be implemented as a resistive divider, having a junction of resistors in the divider that provides the scaling signal 22 to the control system. The scaling network 30 thus can be utilized to scale the respective thresholds 26 and 28 based upon the relative values of the resistors that form the resistive divider of the scaling network 30. The gain scaling implemented by the scaling network 30 thus can provide means to adjust or scale the contribution of each of the internal threshold components 26 and 28 to establish new operating thresholds. The gain scaling can implement a substantially fixed ratio adjustment on the internal threshold components 26 and 28. Under certain circumstances (e.g., load sharing applications) such a fixed ratio adjustment on the thresholds may individually be inadequate.

The system 10 also includes an offset network 32 connected at the output 18 of the switch network 14, such as between the output and electrical ground. The offset network 32 provides an offset signal to the control system 12 corresponding to the second input signal 24 received by the control system 12, which also varies as a function of the signal at the output 18. The offset network 32 can be implemented as including a resistive divider with a junction of resistors thereof providing the corresponding offset signal 24, such as corresponding to the voltage at the output 18 offset according to the configuration of the offset network 32. The offset network 32 thus provides means for applying a desired offset for adjusting of the respective thresholds 26 and 28.

The control system 12 is configured such that the gain scaling signal 22 and the offset signal 24 cooperate with the internal threshold components 26 and 28 to set first and second operating thresholds (e.g., forward and reverse current thresholds) independently of each other. That is, the respective thresholds set (e.g., by a designer) based on the internal threshold components 26 and 28 can be adjusted independently of each other by configuring the scaling network 30 and the offset network 32 appropriately. That is, the scaling network 30 and offset network 32 combine to provide means for setting the forward and reverse current thresholds independently of each other. As used herein, the term "independently" and variations thereof as applied to thresholds is not intended to mean that there is no relationship between the thresholds, but that each of the thresholds can be set to an individual, desired value irrespective of the other threshold. As a result, desired thresholds can be established using the system, which thresholds may vary from application to application. For instance, different applications may require different thresholds, although it may be desired to utilize the same type of control system 12.

Figure 2:
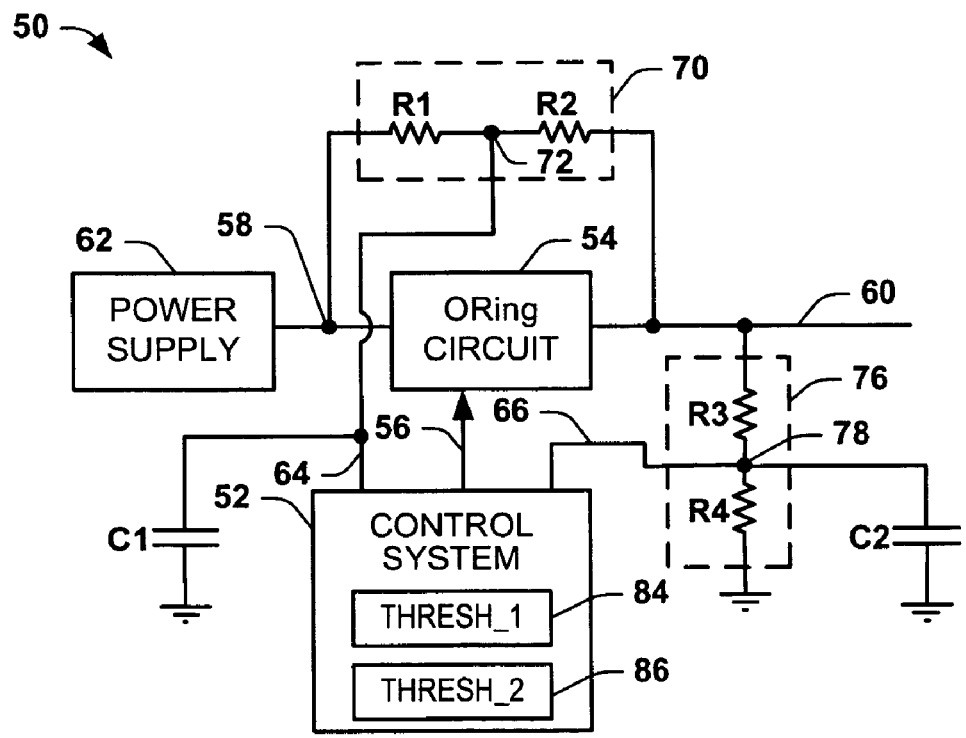
FIG. 2 depicts another embodiment of a system that can be provided according to an aspect of the present invention.

FIG. 2 depicts an example of a system 50 according to one embodiment of the present invention. In FIG. 2, the system 50 includes a control system 52 that is configured to provide a control voltage 56 to an ORing circuit 54. The ORing circuit 54 is one example embodiment of the switch network 14 shown and described with respect to FIG. 1. The ORing circuit 54 is coupled between a power supply voltage 58 and power output bus 60. The control system 52 provides the control signal 56 for controlling the ORing circuit 54 to selectively electrically connect the power supply voltage 58 with the output bus 60. As described herein, the control system 52 can control the ORing circuit 54 based on the voltage across the ORing circuit. For instance, the control system 52 can determine a condition of current through the ORing circuit 54 based on the relative voltages provided at 58 and 60.

The control system 52 can include control logic and comparison circuitry configured to detect the forward and reverse current conditions based on signals received at corresponding first and second inputs 64 and 66. The control system 52 thus provides a control voltage at 56 to control the state of the ORing circuit 54 based on the detected current condition through the ORing circuit.

As one example, the ORing circuit 54 can be implemented as including one or more FETs (metal oxide field effect transistors), such as arranged as one or more OR-FETs. In one such embodiment, for example, an OR-FET includes a source connected to the power supply voltage 58 provided by a corresponding power supply 62. A drain is connected to the output bus 60 to provide a corresponding load voltage for the bus. The control system 52 provides a control voltage at 56 to a gate of the FET of the ORing circuit 54 based on forward and reverse current conditions monitored by the control system. Additionally or alternatively, the ORing circuit 54 can be implemented as back-to-back OR-FETs connected between the power supply voltage and the output bus. The gate of each of the OR-FETs in this back-to-back configuration receives the control voltage that is provided at 56. Thus, the control system 52 controls the state of the ORing circuit 54, on or off, either to electrically connect (e.g., short circuit) the power supply voltage 58 with the output bus 60 or to electrically disconnect (e.g., open circuit) the power supply relative to the output power bus.

In the example of FIG. 2, a scaling network 70 provides a scaled voltage to the first input 64 of the control system 52. The scaling network 70 is connected between the power supply voltage 58 and the output bus 60. The scaling network 70 includes resistors R1 and R2 connected in series between the respective power supply voltage 58 and output bus 60. A juncture 72 between the resistors R1 and R2 is connected to the first input 64 of the control system 52. A capacitor C1 can be connected between the juncture 72 and electrical ground to provide desired filtering of the input signal that is provided to the control system. The filtering of the input signal can vary according to the corresponding RC time constant from the scaling network 70 and capacitor C1.

The system 50 also includes an offset network 76 that provides an offset voltage to the second input 66 of the control system 52. In the example of FIG. 2, the offset network 76 is connected between the output bus 60 and electrical ground. The offset network 76 can include resistors R3 and R4 connected in series between the output bus 60 and electrical ground. A juncture 78 between R3 and R4 can be connected to the second input 66 of the control system 52. A corresponding capacitor C2 can be connected between the juncture 78 and electrical ground to provide desired filtering. By setting the respective resistors R1, R2, R3 and R4 initial thresholds that are set by internal threshold components 84 and 86 of the control system 52 can be adjusted independently of each other. Each of the internal threshold components 84 and 86 can correspond to the fixed internal voltages (e.g., similar to the internal threshold components 26 and 28 described above with respect to FIG. 1). The thresholds established by internal threshold components 84 and 86 can be the same or different from that provided by the internal threshold components 26 and 28 of FIG. 1, and may be set by a designer according to application requirements. It will be understood and appreciated that each of the respective resistors R1, R2, R3 and R4 can be implemented as one or more resistors connected (e.g., in series and/or in parallel) to provide a desired resistance. Similarly, the capacitors C1 and C2 can be implemented by any number and arrangement of one or more capacitors.

For example, the respective forward and reverse current thresholds can be calculated according to the following equations:

$$T1 = -(R1+R2)/(R2/RF)*(VO*R3/(R3+R4)-VT) \qquad \text{Eq. 1}$$

where:
T1=the forward current threshold, with the forward direction going from the power supply voltage 58 to the output bus 60;
RF=the resistance of the ORing circuit 54;
VO=a substantially fixed output voltage of the output bus 60, and
VT=a substantially fixed internal offset voltage of the control system 52.

To set the reverse current threshold (T2) (still assuming a forward direction through the ORing circuit 54), Eq. 1 can be modified to the following:

$$T2 = -(R1+R2)/(R2/RF)*(VO*R3/(R3+R4)+VT) \qquad \text{Eq. 2}$$

From Eqs. 1 and 2, the forward and reverse current thresholds can be set to any desired values independently of each other. This allows significant flexibility, such as may be desired in many load sharing applications.

The following example further illustrates how the forward and reverse current thresholds can be set independently for the example embodiment of FIG. 2. Assume, for instance, that desired reverse current threshold (IR) is −20 amperes and the desired forward current threshold (IF) is −2.5 amperes. Also assuming that the other system parameters from Eqs. 1 and 2 are as follows: VO=1.5 V; RF=0.002Ω; and VT=0.02 V for reverse current and VT=−0.01 V for forward current. Given the above assumptions, the forward and reverse current thresholds can be set accordingly by configuring the scaling network 70 and the offset network 76 as follows: R1=1 KΩ, R2=2KΩ, R3=44.6Ω, and R4=10 KΩ.

When the capacitors C1 and C2 are used to provide filtering of the respective input signals at 64 and 66, the respective RC time constants should be set equal for the scaling network 70 and the offset network 76. The time constants thus can be set according to the following:

$$R1\|R2*C1 = R3\|R4*C2 \qquad \text{Eq. 3}$$

It is noteworthy that when the forward and reverse current thresholds are set accordingly, the value of R3 is greater than an order of magnitude smaller than the other resistances of each of R1, R2 and R4.

Figure 3:
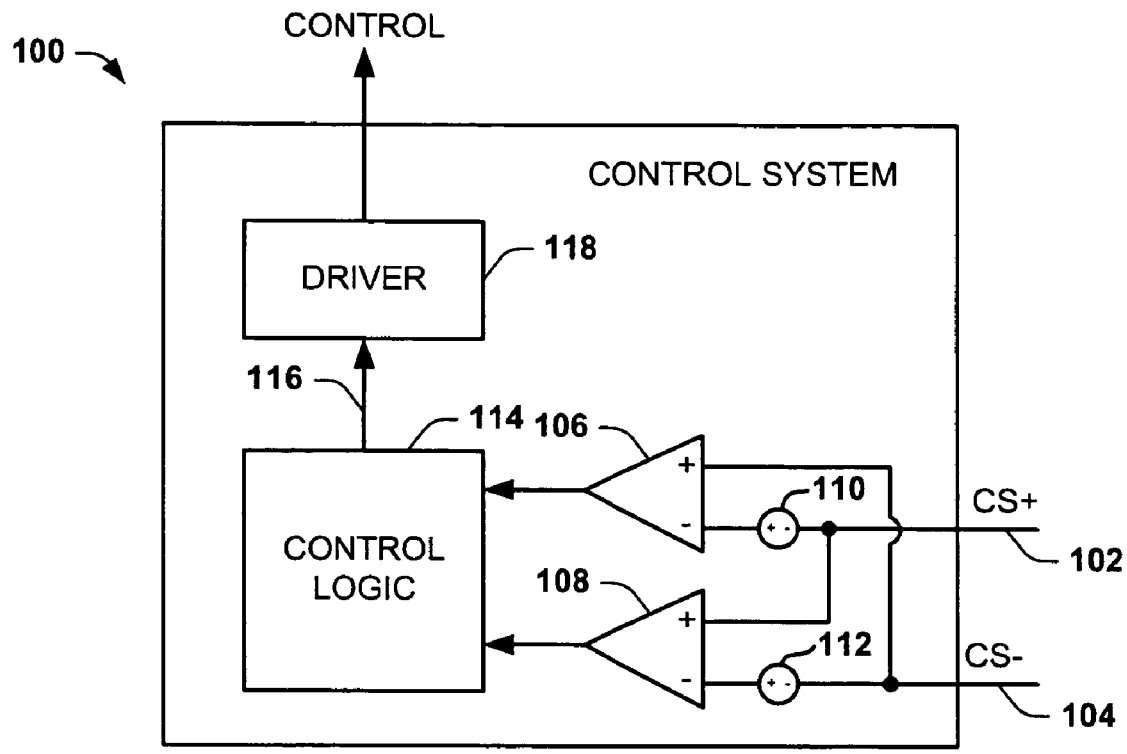
FIG. 3 depicts one embodiment of a control system that can be utilized in conjunction with a system implemented according to an aspect of the present invention.

FIG. 3 depicts an example embodiment of a control system 100 that can be utilized for controlling a switch network with independently established thresholds, such as described herein. For example, the control system 100 includes first and second current sense inputs (CS+) 102 and (CS−) 104 that receive respective input signals. The control system 100 is configured to determine forward and reverse currents through a switch network and provide a corresponding control voltage based on the respective currents.

Referring back to FIG. 2, for example, the input 102 can correspond to the scaling input 64 provided by the scaling network 70 and the input 104 can correspond to the offset input 66 provided by the offset network 76. The inputs 102 and 104 are connected to drive respective comparators 106 and 108. In particular, the input 102 is connected to a non-inverting input of comparator 108. The input 102 is also connected to an inverting input of the comparator 106 through a substantially fixed DC offset voltage 110. The DC voltage 110 establishes a substantially fixed internal threshold that is used for defining a reverse current condition detected by the control system 100.

Similarly, the input 104 is connected to a non-inverting input of the comparator 106 and to an inverting input of comparator 108 through a second DC voltage 112. The DC voltage 112 establishes a substantially fixed DC voltage that is utilized to establish a threshold for defining an internal forward current condition detectable by the control system 100. Each of the DC voltages 110 and 112 thus can correspond to the internal threshold components (e.g., internal threshold components 26 and 28 in FIG. 1 and internal threshold components 84 and 86 in FIG. 2). The thresholds set by DC voltages 110 and 112 can be effectively adjusted based upon contributions provided by the scaling network and the offset network described herein (See, e.g., FIGS. 1 and 2).

The comparator 106 in turn provides an indication of whether a reverse current threshold has been exceeded. The comparator 108 provides an indication of whether a forward current threshold has been exceeded. The control system 100 also includes control logic 114 that is utilized to determine the forward and reverse current conditions based on the inputs provided at 102 and 104. The control logic 114 provides an output control signal 116 to a corresponding driver 118. The driver 118 amplifies the signal 116 from the control logic 114 to provide a corresponding CONTROL voltage signal. The CONTROL voltage can in turn be utilized to control the state of the corresponding switch device, such as an ORing circuit or OR-FET.

By way of example, high reliability power systems use paralleled supplies with ORing circuit switches to connect the supplies together to a common bus. The control system 100 sets the state of the ORing circuit based on whether it is in a forward or reverse current condition. For instance, the reverse current threshold determines how much a faulty supply will reduce the common power bus in a short circuit condition before the fault can be isolated by turning off the ORing circuit. The reverse current threshold also should be set low enough so that in load sharing applications the ORing circuit does not shut off when no load is applied. The forward current threshold determines which supply is at fault during an over voltage condition. The faulty supply is in forward current and the remaining supplies are in reverse current. The reverse current in this case is less than the reverse current in a short circuit condition. Crossing the reverse current threshold on the remaining supplies is not desired since they will latch off. Only the faulty supply should be latched off. Therefore, a low forward current threshold and a larger reverse current threshold may be desirable in certain circumstances.

Figure 4:
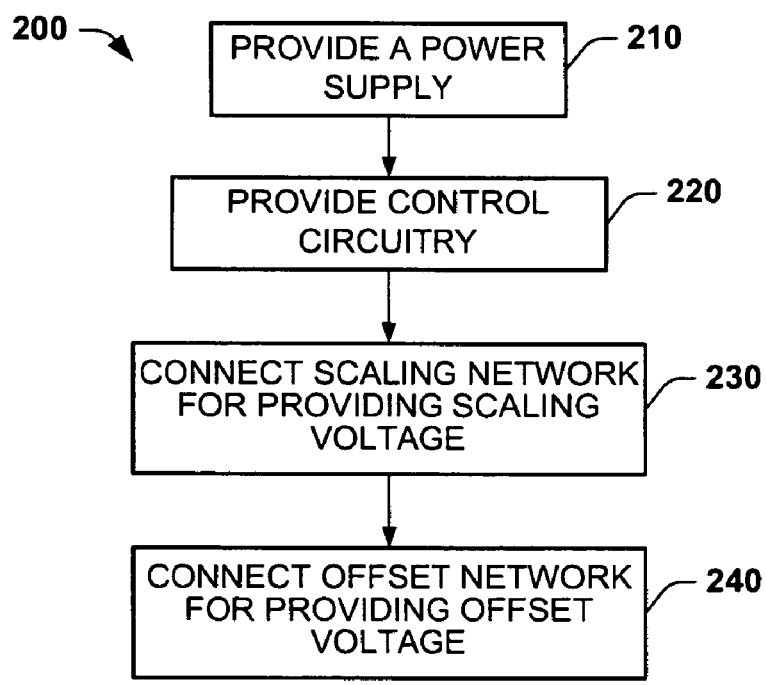
FIG. 4 is a flow diagram depicting one embodiment of a method for controlling thresholds of a power control system according to an aspect of the present invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method.

FIG. 4 depicts an example embodiment of a method 200, such as can be employed to construct a system. As described herein, the system may correspond to a power supply system having independent thresholds, such as shown and described herein.

The method 200 of FIG. 4 begins at 210 in which a power supply is provided. The power supply provides a power supply voltage. An ORing circuit is connected between the power supply voltage and an output power bus. For example, the ORing circuit can be implemented as one or more MOSFETs, such as can be connected as described above with respect to the embodiment of FIG. 2. At 220, the method includes providing control circuitry. The control circuitry can be coupled to control the ORing circuit for selectively electrically connecting the power supply voltage with the output power bus.

At 230, a scaling network is connected for providing a scaling voltage. The scaling network can be connected between the power supply voltage and the output power bus. The scaling network is coupled to provide a scaling voltage to a first input of the control circuitry. At 240, an offset network is connected for providing an offset voltage. The offset network can be connected between the output power bus and electrical ground. The offset network is coupled to provide the offset voltage to a second input of the control circuitry. As one example, the scaling network, the offset network or both can be implemented as shown and described herein with respect to FIGS. 1 and 2. The thresholds further can be set independently of each other according to Eqs. 1 and 2.

The control circuitry controls the ORing circuitry based on first and second thresholds set independently of each other based on the scaling voltage and the offset voltage. The control circuitry further can include circuitry for comparing the scaling voltage relative to the first threshold to provide a first comparator signal. The control circuitry can also include circuitry for comparing the offset voltage relative to the second threshold to provide a second comparator signal. The control circuitry thus provides a control signal to the ORing circuit based on the first and second comparator signals.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. In the claims, unless otherwise indicated, the article "a" is to refer to "one or more than one".

What is claimed is:

1. A system comprising:
a control system that controls a state of a switch network, the control system having first and second thresholds that determine the state of the switch network based on the relative voltages at an input and an output of the switch network;
a scaling network coupled across the input and the output of the switch network and providing a gain scaling signal to a first input of the control system; and an offset network coupled to the output of the switch network and providing an offset signal to a second input of the control system, the first threshold being set independently of the second threshold based on the gain scaling signal and the offset signal.

2. The system of claim 1, wherein the scaling network further comprises a first resistor connected in series with a second resistor between the input and the output of the switch network, a juncture between the first resistor and the second resistor being connected to provide the gain scaling signal to the first input of the control system.

3. The system of claim 1, wherein the offset network further comprises a third resistor connected in series with a fourth resistor between the output of the switch network and electrical ground, a juncture between the third resistor and the fourth resistor being connected to provide the offset signal to the second input of the control system.

4. The system of claim 1, further comprising the switch network connected to conduct electrical current between the input and the output of the switch network based on a control signal provided by the control system.

5. The system of claim 4, wherein the control system further comprises control logic configured to determine a condition of electrical current through the switch network and to provide the control signal accordingly based on the signals at the first and second inputs of the control system relative to the first and second thresholds.

6. The system of claim 5, wherein the control system further comprises:
a first comparator that compares the gain scaling signal relative to the first threshold to provide a first comparator signal; and
a second comparator that compares the offset signal relative to the second threshold to provide a second comparator signal, the control logic determining the condition of current through the switch network based on the first comparator signal and the second comparator signal.

7. The system of claim 1, wherein:
the scaling network further comprises a first resistor connected in series with a second resistor between the input and the output of the switch network, a juncture between the first resistor and the second resistor being connected to provide the gain scaling signal to the first input of the control system; and
the offset network further comprises a third resistor connected in series with a fourth resistor between the output of the switch network and electrical ground, a juncture between the third resistor and the fourth resistor being connected to provide the offset signal to the second input of the control system.

8. The system of claim 1, wherein the switch network further comprises at least one field effect transistor having a source connected to the voltage provided at the input of the switch network, a drain connected to the output of the switch network, and a gate connected to receive a control voltage provided by the control system to turn the field effect transistor on or off based on the signals at the first input and the second input of the control system.

9. A system comprising:
an ORing circuit connected between a power supply voltage and a load voltage;
a controller having first and second inputs, the controller being configured to provide a control signal to the ORing circuit based on the voltage across the first and second inputs thereof relative to first and second thresholds;

a first resistive divider coupled between the power supply voltage and the load voltage, with an intermediate junction of the first resistive divider providing a first voltage to the first input of the controller; and
a second resistive divider coupled between the load voltage and electrical ground, with an intermediate junction of the second resistive divider providing a second voltage to the second input of the control system, the resistance of the first and second resistive dividers establishing the first threshold and the second threshold independently of each other.

10. The system of claim 9, wherein the ORing circuit further comprises at least one field effect transistor having a source connected to the power supply voltage, a drain connected to output, and a gate connected to receive a control voltage provided by the controller to turn the field effect transistor on or off based on the first voltage and the second voltage provided respectively at the first input and the second input of the control system.

11. The system of claim 9, wherein the controller further comprises control logic configured to determine a condition of electrical current in the ORing circuit based on the first voltage and the second voltage relative to the first and second thresholds, the controller providing the control signal based on the determined condition of the electrical current in the ORing circuit.

12. The system of claim 11, wherein the controller further comprises:
a first comparator that compares the first voltage relative to the first threshold to provide a first comparator signal; and
a second comparator that compares the second voltage relative to the second threshold to provide a second comparator signal, the control logic determining the condition of electrical current in the ORing circuit based on the first comparator signal and the second comparator signal.

13. The system of claim 12, wherein the first resistive divider further comprises:
a first resistor;
a second resistor connected in series with first resistor between the power supply voltage and the load voltage; and
a juncture between the first resistor and the second resistor connected to provide first voltage to the first input of the controller.

14. The system of claim 13, wherein the second resistive divider further comprises:
a third resistor;
a fourth resistor connected in series with third resistor between the load voltage and electrical ground; and
a juncture between the third resistor and the fourth resistor connected to provide the second voltage to the second input of the controller.

15. The system of claim 14, wherein the first threshold (T1) and the second threshold (T2) are set independently from each other according to:

$$T1 = -(R1+R2)/(R2/RF)*(VO*R3/(R3+R4)-VT), \text{ and}$$

$$T2 - (R1+R2)/(R2/RF)*(VO*R3/(R3+R4)+VT),$$

where
R1=a resistance of the first resistor;
R2=a resistance of the second resistor;
R3=a resistance of the third resistor;

R4=a resistance of the fourth resistor;
VO=the power supply voltage, and
VT=a predetermined substantially fixed internal offset voltage of the controller.

16. A method comprising:
providing a power supply that provides a power supply voltage;
connecting an ORing circuit between the power supply voltage and an output power bus;
providing control circuitry coupled to control the ORing circuit for selectively electrically connecting the power supply voltage with the output power bus;
connecting a scaling network between the power supply voltage and the output power bus, the scaling network being coupled to provide a sealing voltage to a first input of the control circuitry; and
connecting an offset network between the output power bus and electrical ground, the offset network coupled to provide an offset voltage to a second input of the control circuitry, the control circuitry controlling the ORing circuitry based on first and second thresholds set independently of each other based on the scaling voltage and the offset voltage.

17. The method of claim 16, wherein the control circuitry further comprises circuitry for comparing the scaling voltage relative to the first threshold to provide a first comparator signal and circuitry for comparing the offset voltage relative to the second threshold to provide a second comparator signal, the control circuitry being coupled to provide a control signal to the ORing circuit based on the first and second comparator signals.

18. The method of claim 17, wherein:
the first resistive divider comprises a first resistor connected in series with a second resistor between the power supply voltage and the output power bus, a juncture between the first resistor and the second resistor connected to provide the scaling voltage to the first input of the control circuitry, and
the second resistive divider comprises a third resistor connected in series with a fourth resistor between the output power bus and electrical ground, a juncture between the third resistor and the fourth resistor connected to provide the offset voltage to the second input of the control circuitry.

19. The method of claim 18, further comprising setting the first threshold (T1) and the second threshold (T2) independently of each other according to:

$$T1 = -(R1+R2)/(R2/RF)*(VO*R3/(R3+R4)) - VT, \text{ and}$$

$$T2 = -(R1+R2)/(R2/RF)*(VO*R3/(R3+R4)) + VT,$$

where
R1=a resistance of the first resistor;
R2=a resistance of the second resistor;
R3=a resistance of the third resistor;
R4=a resistance of the fourth resistor
VO=the power supply voltage, and
VT=a predetermined substantially fixed internal offset voltage of the control circuitry.

20. The method of claim 16, wherein the ORing circuit comprises at least one field effect transistor having a source, a drain and a gate, the method further comprising:
connecting the source to the power supply voltage,
connecting the drain to the output power bus, and
connecting the gate to receive a control signal from the control circuitry.

21. The system of claim 5, where the first threshold is a forward current threshold that determines an amount of forward electrical current that can be tolerated across the switch network, and the second threshold is a reverse current threshold that determines an amount of reverse electrical current that can be tolerated across the switch network.

22. The system of claim 6, wherein the first threshold is set by the offset signal, and the second threshold is set by the gain scaling signal.

23. The system of claim 11, wherein the first threshold is a forward current threshold that determines an amount of forward electrical current that can be tolerated across the ORing circuit, and the second threshold is a reverse current threshold that determines an amount of reverse electrical current that can be tolerated across the ORing circuit.

24. The system of claim 12, wherein the first threshold is set by the second voltage, and where the second threshold is set by the first voltage.

25. The method of claim 16, wherein the first threshold is a forward current threshold that determines an amount of forward electrical current that can be tolerated across the ORing circuit, and the second threshold is a reverse current threshold that determines an amount of reverse electrical current that can be tolerated across the ORing circuit.

26. The method of claim 17, further comprising:
setting the first threshold using the offset voltage; and
setting the second threshold using the scaling voltage.

* * * * *

UNITED STATES PATENT AND TRADEMARK OFFICE
CERTIFICATE OF CORRECTION

PATENT NO. : 7,649,404 B2  Page 1 of 1
APPLICATION NO. : 11/580756
DATED : January 19, 2010
INVENTOR(S) : John Sikora et al.

It is certified that error appears in the above-identified patent and that said Letters Patent is hereby corrected as shown below:

In column 8, line 57, in Claim 15, delete "(TI)" and insert -- (T1) --, therefor, In column 9, line 15, in Claim 16, delete "sealing" and insert -- scaling --, therefor.

In column 10, line 8, in Claim 19, after "resistor" insert -- ; --.

Signed and Sealed this

Thirtieth Day of March, 2010

David J. Kappos
*Director of the United States Patent and Trademark Office*